United States Patent [19]
Kawamura

[11] Patent Number: 4,955,199
[45] Date of Patent: Sep. 11, 1990

[54] DRIVE SYSTEM FOR TURBOCHARGERS WITH ROTARY ELECTRIC MACHINES

[75] Inventor: Hideo Kawamura, Samukawa, Japan

[73] Assignee: Isuzu Ceramics Research Institute Co., Ltd., Fujisawa, Japan

[21] Appl. No.: 381,320

[22] Filed: Jul. 18, 1989

[30] Foreign Application Priority Data

Jul. 18, 1988 [JP] Japan .................................. 63-178723

[51] Int. Cl.$^5$ ............................................. F02B 37/04
[52] U.S. Cl. .......................................... 60/608; 60/612
[58] Field of Search ........................ 60/607, 608, 612; 123/193 C, 501

[56] References Cited

U.S. PATENT DOCUMENTS

| | | | |
|---|---|---|---|
| 4,332,227 | 6/1982 | Bauer et al. ................. | 123/501 X |
| 4,432,326 | 2/1984 | Roca-Nierga ................ | 123/501 |
| 4,598,675 | 7/1986 | Long .............................. | 123/90.51 |
| 4,680,933 | 7/1987 | Bozung et al. ................ | 60/608 |
| 4,757,686 | 7/1988 | Kawamura et al. .......... | 60/608 |

FOREIGN PATENT DOCUMENTS

| | | |
|---|---|---|
| 212988 | 3/1987 | European Pat. Off. . |
| 223419 | 5/1987 | European Pat. Off. . |
| 3539782 | 5/1987 | Fed. Rep. of Germany . |
| 2059816 | 6/1971 | France . |
| 2183337 | 12/1973 | France . |
| 119945 | 7/1983 | Japan . |
| 141711 | 8/1984 | Japan . |
| 101630 | 5/1986 | Japan . |
| 2062752 | 5/1981 | United Kingdom . |

Primary Examiner—Michael Koczo
Attorney, Agent, or Firm—Staas & Halsey

[57] ABSTRACT

A turbocharger drive system associated with an internal combustion engine includes a plurality of turbochargers drivable by exhaust gases from the engine, a plurality or rotary electric machines mounted on the rotatable shafts, respectively, of the turbochargers and operable as electric motors or generators, and a single rotary electric machine coupled to the rotatable shaft of the engine. When the engine rotates at a low speed and under a high load, the rotary electric machine coupled to the engine shaft operates as an electric generator to generate electric power to drive the rotary electric machines mounted on the turbocharger shafts as electric motors, so that the boost pressure is increased to increase the output power of the engine. As the temperature in the combustion chambers rises because of the increased output power of the engine, the timing for supplying fuel into the combustion chambers is delayed to normalize the timing to start burning fuel, which would otherwise be advanced.

11 Claims, 4 Drawing Sheets

DRIVE SYSTEM FOR TURBOCHARGERS WITH ROTARY ELECTRIC MACHINES

BACKGROUND OF THE INVENTION

1. Field of the Invention:

The present invention relates to a drive system for turbochargers with motor-generators mounted on their rotatable shafts, and more particularly to a drive system for a multistage turbocharger assembly with series-connected turbines and compressors.

2. Description of Prior Art:

There are known turbine-driven turbochargers in which exhaust gases emitted from an engine are led to an exhaust turbine to rotate the turbine and a compressor coupled thereto at a high speed for supercharging the engine. Japanese Laid-Open Patent Publication No. 60-43152 discloses a system for recovering and feeding any remaining exhaust energy back to the shaft of the engine after the exhaust energy from the engine has been recovered by the exhaust turbine to drive the compressor. The disclosed system has a rotary electric machine and an intake air compressor which are mounted on the rotatable shaft of the exhaust turbine. The exhaust energy which is recovered as rotational energy by the exhaust turbine is used to rotate the compressor for supercharging the engine. At the same time, the rotary electric machine operates as an electric generator to generate electric energy which is supplied to an electric motor coupled to the shaft of the engine. The motor coupled to the engine shaft is rotated to assist in rotating the engine shaft, thereby feeding the exhaust energy recovered by the exhaust turbine back to the engine shaft.

When the engine rotates at a low speed and hence the exhaust energy is small, however, the above system can neither generate electric energy nor supercharge the engine. To avoid this shortcoming, a system has been proposed a system in which when the engine rotates at a low speed, the rotary electric machine mounted on the rotatable shaft of the exhaust turbine is operated as a motor to rotate the compressor through the rotatable shaft for supercharging the engine (see Japanese Laid-Open Patent Publication No. 60-195329).

When the engine rotates at a low speed and under a high load, the rotary electric machine mounted in the turbocharger is driven as an electric motor to assist in operating the compressor for thereby increasing the boost pressure under which air is charged into the engine. Therefore, the temperature of the engine at the end of its compression stroke rises. In a thermally insulated engine with combustion chamber inner walls made of thermally insulating material, the temperature at the compression stroke end is higher than that of conventional engines. Since the temperature in the combustion chambers of the engine is high, fuel supplied into the combustion chambers tends to start being ignited faster than a preset timing.

The system disclosed in Japanese Laid-Open Patent Publication No. 60-195329 does not vary the timing for injecting fuel into the engine. Therefore, when the engine undergoes a high load at which the temperature in the combustion chambers is high, fuel supplied into the combustion chambers is not combusted under normal conditions. As a result, the engine output power is lowered, and pollutants contained in exhaust gases are increased.

SUMMARY OF THE INVENTION

It is an object of the present invention to provide a turbocharger drive system which includes a plurality of series-connected turbochargers coupled to an engine exhaust system and having respective rotatable shafts with rotary electric machines mounted thereon, and which operates the rotary electric machines as electric motors to assist in rotating the turbochargers when an engine rotates at a low speed and under a high load and hence the energy of exhaust gases from the engine is low.

Another object of the present invention is to provide a turbocharger drive system which can vary the timing for supplying fuel into an engine so that the fuel supplying timing will be delayed to normalize the timing for starting to burn fuel when the amount of fuel supplied is increased and the temperature in the combustion chambers of the engine is increased to delay the timing for starting to burn fuel.

According to the present invention, there is provided a turbocharger drive system combined with an internal combustion engine, comprising a turbocharger assembly having a rotatable shaft, a first rotary electric machine mounted on the rotatable shaft, means for detecting a load on the internal combustion engine, means for detecting a rotational speed of the internal combustion engine, means for supplying fuel to the internal combustion engine, a second rotary electric machine operatively coupled to an output shaft of the internal combustion engine, means for driving the first rotary electric machine as an electric motor when it is determined from signals from the means for detecting the load and the means for detecting the rotational speed that the internal combustion engine rotates at a low speed and under a high load, means for operating the second rotary electric machine as an electric generator, means for supplying electric power generated by the electric generator to the electric motor, and means for delaying a timing to supply fuel from the fuel supplying means to the internal combustion engine when at least one of an increase in the load and a reduction in the rotational speed is detected by the means for detecting the load and the means for detecting the rotational speed.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
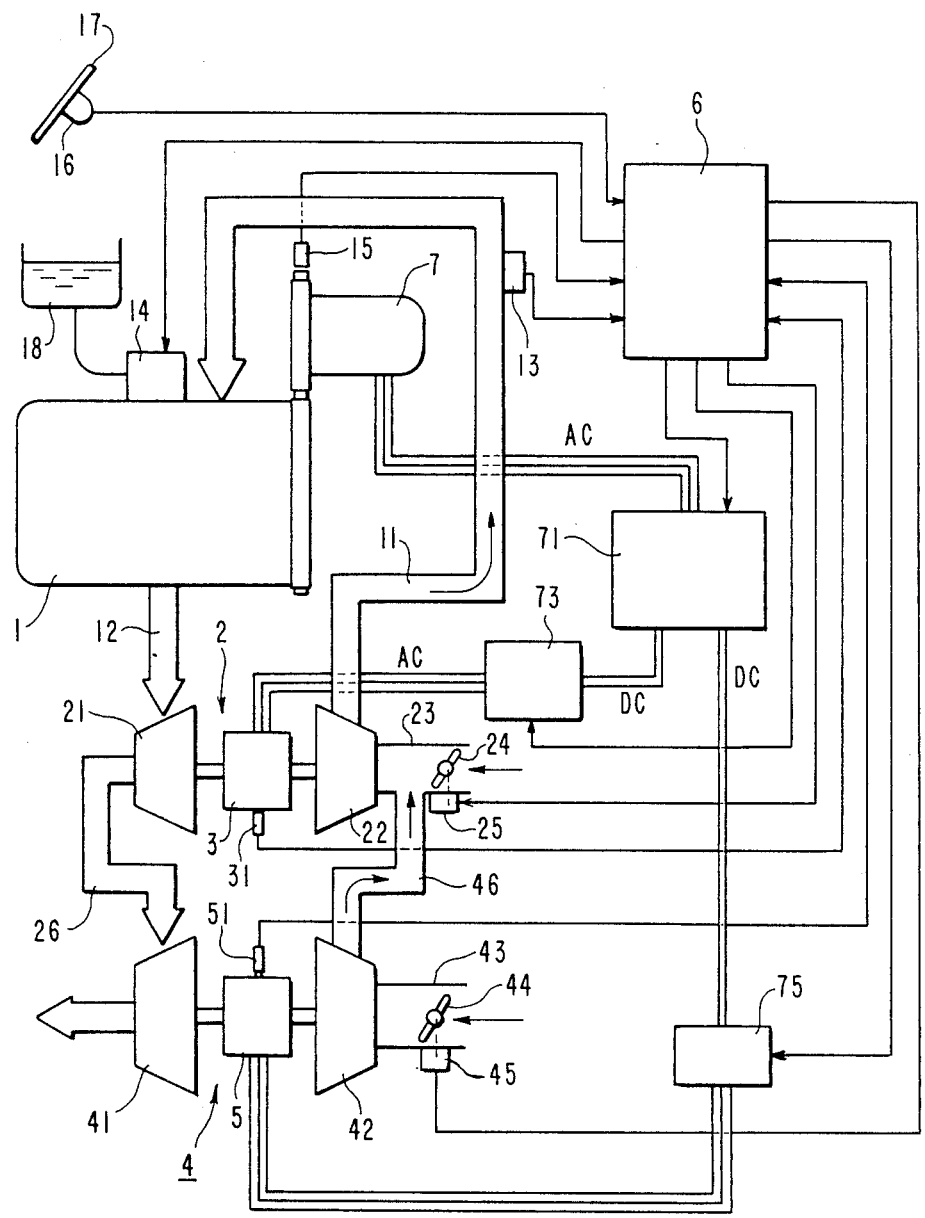
FIG. 1 is a block diagram of a drive system for turbochargers with rotary electric machines according to the present invention.

FIG. 1 shows in block form of a turbocharger drive system according to the present invention.

An engine 1 mounted on a motor vehicle (not shown) is a thermally insulated internal combustion engine having at least inner walls of cylinders and a cylinder head, piston rings, piston head surfaces, an inner wall of an exhaust passage, and intake and exhaust valves, all made of thermally insulated fine ceramic. Air supplied from an air intake passage 11 and fuel injected into the cylinders are mixed into an air-fuel mixture which is then combusted to produce energy to drive the motor vehicle. Exhaust gases are then discharged from the cylinders through an exhaust passage 12.

A first turbocharger 2 has an exhaust turbine 21 connected to the exhaust passage 12 and a compressor 22 connected to the air intake passage 11. The compressor 22 is directly coupled to the rotatable shaft of the exhaust turbine 21.

When the exhaust turbine 21 is rotated by the exhaust gases discharged by the exhaust passage 12, the compressor 22 is also rotated and compresses intake air which is fed through the air intake passage 11 to supercharge the engine 1. The compressor 22 is coupled to an intake pipe 23 having a valve 24 disposed therein. The intake pipe 23 defines an air passage which is selectively opened and closed by the valve 24 that is controlled by a valve actuator 25.

A rotary electric machine 3 is mounted on the rotatable shaft by which the exhaust turbine 21 and the compressor 22 are directly connected to each other. When electric energy is supplied to the rotary electric machine 3, it operates as an electric motor to rotate the compressor 22 for assisting in rotating the compressor 22 to supercharge the engine 1. When the rotary electric machine 3 is rotated by the exhaust turbine 21, it operates as an electric generator to generate electric power. A rotational speed sensor 1 detects the rotational speed of the rotary electric machine 3, i.e., the rotational speed of the first turbocharger 2, and transmits a rotational speed signal to a controller 6 (described later on).

A second turbocharger 4 has an exhaust turbine 41 connected to an exhaust passage 26 of the first turbocharger and a compressor 42 connected to the compressor 22 of the first turbocharger 2 through an air feed pipe 46. The compressor 42 is directly coupled to the rotatable shaft of the exhaust turbine 41.

When the exhaust turbine 41 is rotated by the exhaust gases discharged from the first turbocharger 2 through the exhaust passage 26, the compressor 42 is also rotated and compresses intake air to increase the intake air pressure developed by the compressor 22 through the air feed pipe 46. The compressor 42 is coupled to an intake pipe 43 having a valve 44 disposed therein. The intake pipe 43 defines an air passage which is selectively opened and closed by the valve 44 that is controlled by a valve actuator 45. Control signals are supplied from the controller 6 to the valve actuators 25, 45.

A rotary electric machine 5 is mounted on the rotatable shaft by which the exhaust turbine 41 and the compressor 42 are directly connected to each other. When electric energy is supplied to the rotary electric machine 5, it operates as an electric motor to rotate the compressor 42 for assisting in rotating the compressor 42 to supercharge the engine 1. When the rotary electric machine 5 is rotated by the exhaust turbine 41, it operates as an electric generator to generate electric power. A rotational speed sensor 51 detects the rotational speed of the rotary electric machine 5, i.e., the rotational speed of the second turbocharger 5, and transmits a rotational speed signal to the controller 6. A boost pressure sensor 13 is mounted in the intake passages 11 for detecting the boost pressure of intake air to be supplied to the engine 1. A detected signal from the sensor 13 is also sent to the controller 6.

A rotary electric machine 7 is coupled to the rotatable shaft of the engine 1 through a gear train. When the rotary electric machine 7 is driven by the engine 1, it operates as an electric generator. When electric energy is supplied to the rotary electric machine 7 from a dual electric power converter 71, it operates as an electric motor.

The dual electric power converter device 71 has one three-phase AC terminal and two DC terminals. These two DC terminals are connected parallel to each other in the dual electric power converter device 71, and are coupled to DC terminals of a bidirectional AC/DC converter unit in the dual electric power converter device 71.

The bidirectional AC/DC converter unit comprises an inverter and a converter which are connected parallel to each other. For converting electric energy from DC to AC, the inverter is operated, and for converting electric energy from AC to DC, the converter is operated. The bidirectional AC/DC converter unit will not be described in greater detail as it is a known circuit disclosed in detail in *Thyristor Phase-Controlled Converters*, pages 111 through 144, written by B. R. Pelly and published by WILLY-INTERSCIENCE.

A control signal for switching the operation of the bidirectional AC/DC converter unit is supplied from the controller 6.

Dual converter units 73, 75 each comprise a bidirectional AC/DC converter unit which is identical to the bidirectional AC/DC converter unit as described above. The dual converter unit 73 has a DC terminal connected to one of the DC terminals of the dual electric power converter device 71, and an AC terminal connected to the rotary electric machine 3. The dual converter unit 75 has a DC terminal connected to the other DC terminal of the dual electric power converter device 71, and an AC terminal connected to the rotary electric machine 5.

A fuel supply mechanism 14 controls the rate of flow of fuel from a fuel tank 18 to the engine 1 and the timing for injecting fuel into the engine 1. A control signal is supplied from the controller 6 to the fuel supply mechanism 14.

The rotational speed of the engine 1 is detected by an engine rotational speed sensor 15 which applies a detected signal to the controller 6. An accelerator pedal movement sensor 16 detects the amount of depression of an accelerator pedal 17 which controls the output power of the engine 1. A detected signal from the accelerator pedal movement sensor 16 is sent to the controller 6.

The controller 6 comprises a microcomputer and has a central processing unit for effecting various arithmetic operations, memories for storing a processing or control sequence, and input/output ports. When signals from the various sensors are applied to the controller 6, the controller 6 carries out predetermined arithmetic operations and delivers control signals to the valve actuators 25, 45, the dual electric power converter device 71, and the dual converter units 73, 75 according to the stored control sequence.

Operation of the turbocharger drive system thus constructed will be described below.

When the rotational speed of the engine 1 is high and a large amount of exhaust gases is discharged from the exhaust passage 12, the first and second turbochargers 2, 4 are operated by the energy of the exhaust gases. The valve 24 associated with the first turbocharger 2 is opened, and the valve 44 associated with the second turbocharger 4 is closed. The engine 1 is supercharged by the compressor 22 of the first turbocharger 2. The rotary electric machine 3 is operated as a generator, and electric power generated by the rotary electric machine 3 is supplied through the dual converter unit 73 and the dual electric power converter device 71 to the rotary electric machine 7 to rotate the latter for assisting in rotating the rotatable shaft of the engine 1, so that the exhaust gas energy is fed back to the engine 1.

During this time, the controller 6 calculates a power supply frequency for rotating the rotary electric machine 7 at a speed higher than the engine 1, based on the output signal from the engine rotational speed sensor 15. The controller 6 then controls the output frequency of the inverter of the dual electric power converter 71 based on the calculated power supply frequency, while operating the rotary electric machine 7 as a motor.

The rotary electric machine 5 combined with the second turbocharger 4 is also operated as a generator, and electric power generated by the rotary electric machine 5 is supplied through the dual converter unit 75 and the dual electric power converter device 71 to the rotary electric machine 7. The rotary electric machine 7 is therefore driven to assist in rotating the rotatable shaft of the engine 1, so that the exhaust gas energy is fed back to the engine 1.

At this time, the controller 6 controls the output voltage of the converter of the dual converter unit 75 to equalize the DC output voltage of the dual converter unit 75 with the output voltage of the dual converter unit 73. The controller 6 also measures the direct currents of the dual converter units 73, 75 with sensors (not shown), and control the proportion of loads borne by the dual converter units 73, 75.

If the engine 1 undergoes a high load and the rotational speed of the engine 1 does not increase even by depressing the accelerator pedal 17, then the valve 24 is closed and the valve 44 is opened. The rotary electric machines 3, 5 combined with the first and second turbochargers 2, 4 are operated as motors to assist in rotating the compressors 22, 42 for supercharging the engine 1, thereby increasing the torque produced by the engine 1.

The electric power which drives the rotary electric machines 3, 5 at this time is generated by the rotary electric machine 7.

The electric power generated by the rotary electric machine 7 is converted by the dual electric power converter 71 to DC electric power that is supplied to the dual converter units 73, 75. The controller 6 calculates power supply frequencies at which the rotary electric machines 3, 5 can be operated as motors, based on the output signals from the rotational speed sensors 31, 51. The controller 6 then controls the output frequencies of the inverters of the dual converter units 73, 75 based on the calculated power supply frequencies.

The DC electric power supplied to the dual converter units 73, 75 is then converted to three-phase AC electric power having the above output frequencies. The three-phase AC electric power is then supplied to the rotary electric machines 3, 5 to operate them as motors.

The boost pressure increased in response to the operation of the rotary electric machines 3, 5 is detected by the boost pressure sensor 13. The rate of flow of fuel is controlled depending on the detected boost pressure and the amount of depression of the accelerator pedal 17. When the engine speed is low as detected by the engine rotational speed sensor 15, the timing for injecting fuel into the engine 1 is delayed. When the engine speed is high as detected by the engine rotational speed sensor 15, the timing for injecting fuel into the engine 1 is advanced. The fuel injecting timing is also delayed when the rate of flow of fuel is large since the temperature of the combustion chamber walls is increased and the ignition delay time is reduced.

Figure 2A:
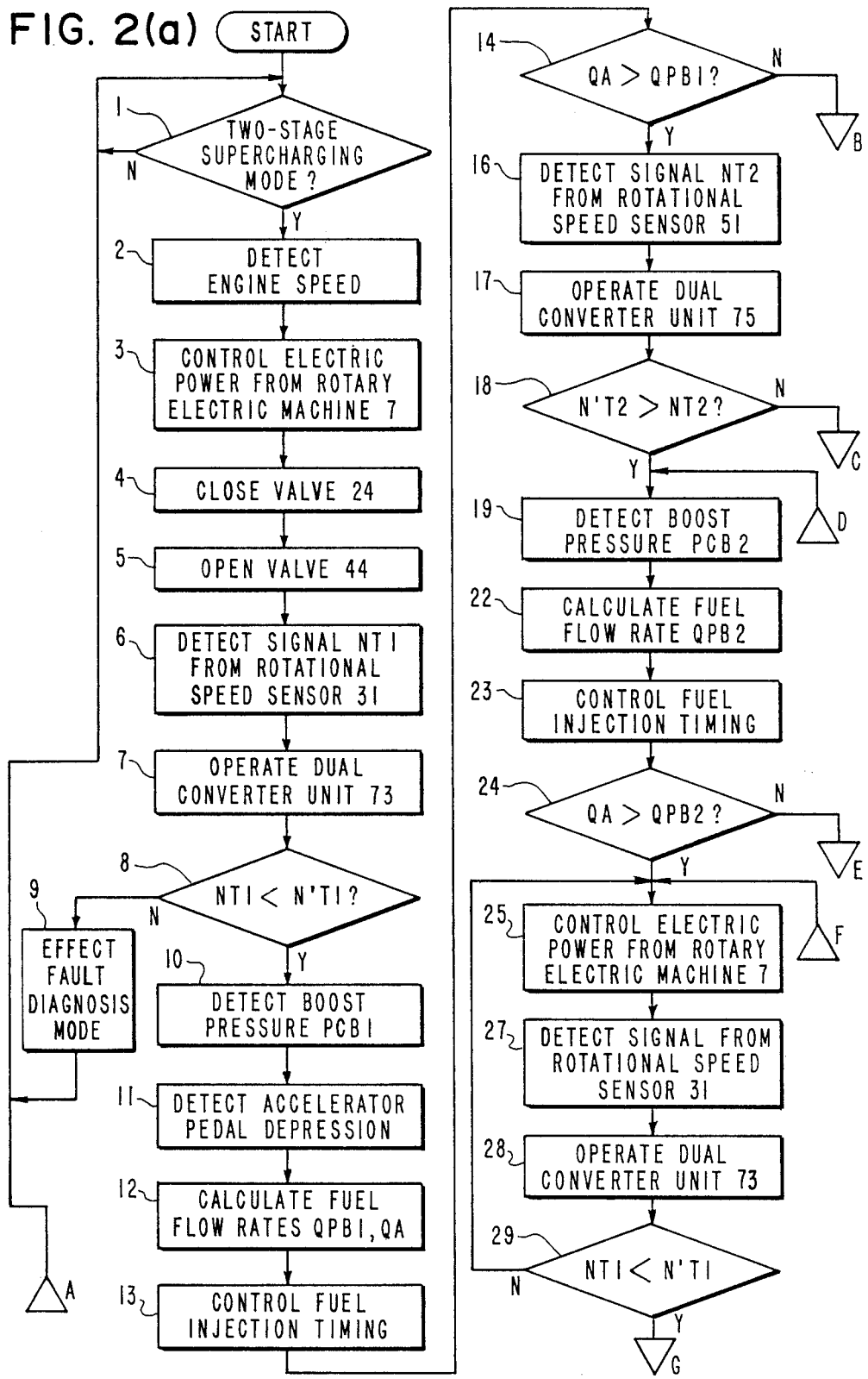
FIGS. 2A and 2B are a flowchart of an operation sequence of the drive system shown in FIG. 1.
Figure 2B:
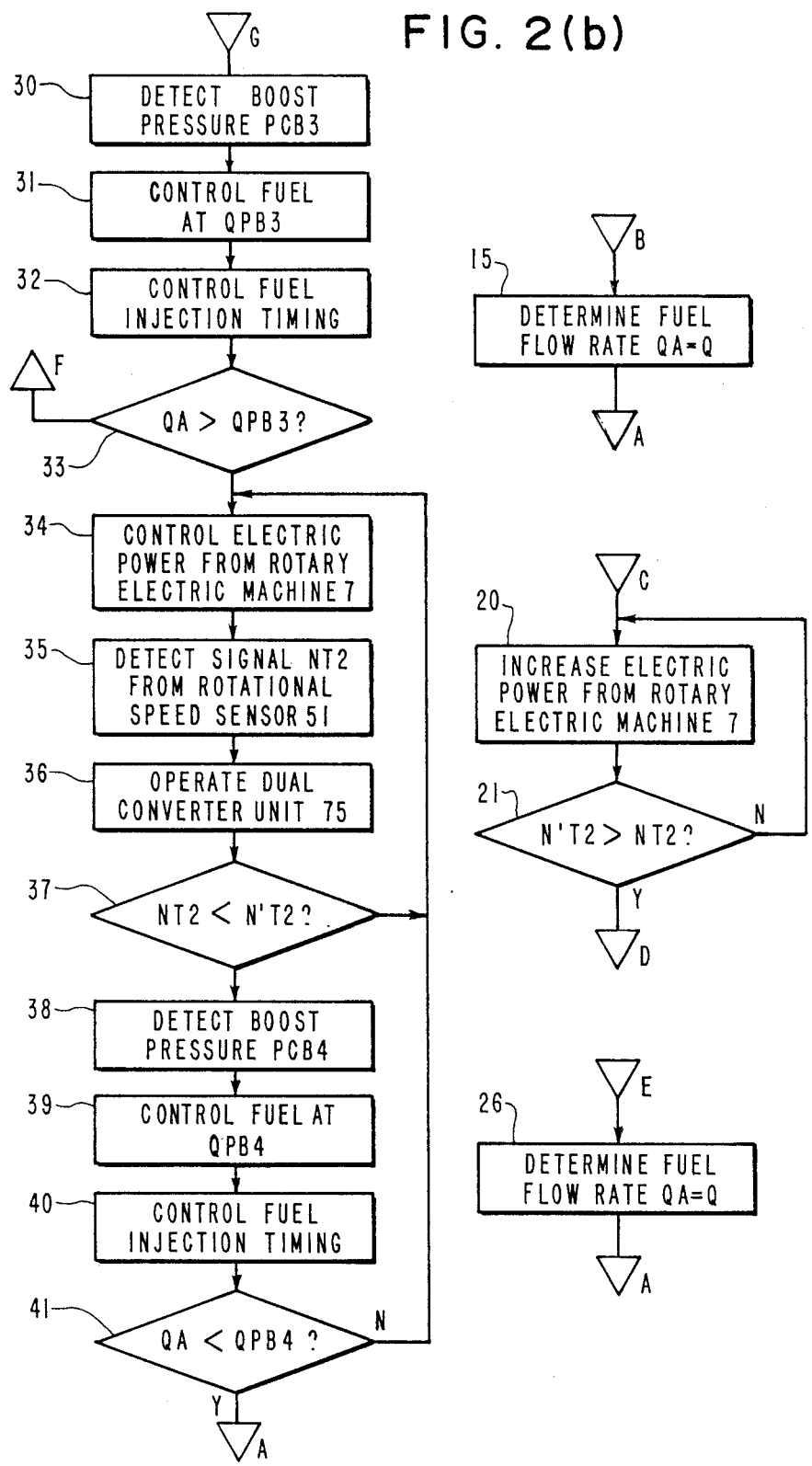

FIGS. 2A and 2B are a flowchart showing an operation sequence to be executed by the controller 6.

The rotational speed signal from the engine rotational speed sensor 15 and the accelerator pedal depression signal from the accelerator pedal movement sensor 16 are read, and it is determined, based on the read signals, whether the engine 1 rotates at a low speed and under a high load, and the boost pressure is to be increased in a two-stage supercharging mode, or not, in a step 1. If the boost pressure is to be increased, control proceeds to a step 2.

In the step 2, the rotational speed signal from the engine rotational speed sensor 15 is read again.

In a step 3, the controller 6 applies a signal to the dual electric power converter device 71 to operate the rotary electric machine 7 as an electric generator.

In a step 4, the controller 6 applies a signal to the valve actuator 25 to close the valve 24 disposed in the intake pipe 23 of the first turbocharger 2.

In a step 5, the controller 6 applies a signal to the valve actuator 45 to open the valve 44 disposed in the intake pipe 43 of the second turbocharger 4.

The rotational speed NT1 of the first turbocharger 2 is detected by the rotational speed sensor 31 and sent to the controller 6 in a step 6.

In a step 7, the controller 6 applies a signal to the dual converter unit 73 to convert the output electric power from the dual electric power converter device 71 to three-phase electric power having such a frequency as to rotate the rotary electric machine 3 at a speed higher than the rotational speed NT1 detected in the step 6. The converted electric power is supplied from the dual converter unit 73 to the rotary electric machine 3 to drive the latter as a motor.

The rotational speed N'T1 of the first turbocharger 2 is detected again by the rotational speed sensor 31, and is compared with the rotational speed NT1 to determine whether the rotational speed of the first turbocharger 2 has increased or not in a step 8. If not increased, control goes to a step 9, and if increased, control proceeds to a step 10.

In the step 9, the controller 6 diagnoses the drive system for a fault in a predetermined fault diagnosis mode.

In the step 10, the controller 6 reads the detected signal PCB1 from the boost pressure sensor 13.

In a step 11, the controller 6 reads again the accelerator pedal depression signal from the accelerator pedal movement sensor 16.

Then, the controller 6 calculates in a step 12 a fuel flow rate QPB1 corresponding to the detected signal PCB1 read in the step 10 and a fuel flow rate QA corresponding to the accelerator pedal depression signal read in the step 11.

In a next step 13, the controller 6 calculates a fuel injection timing based on the fuel flow rate QPB1 calculated in the step 12 and the detected signal read in the step 2.

In a step 14, the controller 6 compares the fuel flow rates QPB1, QA calculated in the step 12. If QA is smaller than QPB1, then control goes to a step 15, and if QA is larger than QPB1, then control proceeds to a step 16.

In the step 15, since the boost pressure is sufficiently high with respect to the load on the engine 1, the smaller fuel flow rate QA is set as an actual fuel flow rate Q, and fuel is supplied to the engine 1 at the flow rate Q at the timing calculated in the step 13.

The rotational speed NT2 of the second turbocharger 4 is detected by the rotational speed sensor 51 in a step 16.

In a step 17, the controller 6 applies a signal to the dual converter unit 75 to convert the output electric power from the dual electric power converter device 71 to three-phase electric power having such a frequency as to rotate the rotary electric machine 5 at a speed higher than the rotational speed NT2 detected in the step 16. The converted electric power is supplied from the dual converter unit 75 to the rotary electric machine 5 to drive the latter as a motor.

The rotational speed N'T2 of the second turbocharger 4 is detected again by the rotational speed sensor 51, and is compared with the rotational speed NT2 to determine whether the rotational speed of the second turbocharger 4 has increased or not in a step 18. If not increased, control goes to a step 20, and if increased, control proceeds to a step 19.

In the step 19, the controller 6 reads the detected signal PCB2 from the boost pressure sensor 13.

In the step 20, the controller 6 applies a signal to the dual electric power converter device 71 to increase the electric power therefrom.

The rotational speed N'T2 of the second turbocharger 4 is detected again by the rotational speed sensor 51, and is compared with the rotational speed NT2 detected in the step 16 to determine whether the rotational speed of the second turbocharger 4 has increased or not in a step 21. If increased, control goes to the step 19.

Then, the controller 6 calculates in a step 22 a fuel flow rate QPB2 corresponding to the detected signal PCB2 read in the step 19.

In a next step 23, the controller 6 calculates a fuel injection timing based on the fuel flow rate QPB2 calculated in the step 22 and the detected signal read in the step 2.

In a step 24, the controller 6 compares the fuel flow rates QPB2 calculated in the step 22 and QA calculated in the step 12. If QA is smaller than QPB2, then control goes to a step 26, and if QA is larger than QPB2, then control proceeds to a step 25.

In the step 25, the controller 6 applies a signal to the dual electric power converter device 71 to increase the electric power therefrom.

In the step 26, since the boost pressure is sufficiently high with respect to the load on the engine 1, the smaller fuel flow rate QA is set as an actual fuel flow rate Q, and fuel is supplied to the engine 1 at the flow rate Q at the timing calculated in the step 23.

The rotational speed NT1 of the first turbocharger 2 is detected by the rotational speed sensor 31 in a step 27.

In a step 28, the controller 6 applies a signal to the dual converter unit 73 to convert the output electric power from the dual electric power converter device 71 to three-phase electric power having such a frequency as to rotate the rotary electric machine 3 at a speed higher than the rotational speed NT1 detected in the step 27. The converted electric power is supplied from the dual converter unit 73 to the rotary electric machine 3 to drive the latter as a motor.

The rotational speed N'T1 of the first turbocharger 2 is detected again by the rotational speed sensor 31, and is compared with the rotational speed NT1 detected in the step 27 to determine whether the rotational speed of the first turbocharger 2 has increased or not in a step 29. If not increased, control returns to the step 25, and if increased, control proceeds to a step 30.

In the step 30, the controller 6 reads the detected signal PCB3 from the boost pressure sensor 13.

Then, the controller 6 calculates in a step 31 a fuel flow rate QPB3 corresponding to the detected signal PCB3 read in the step 30.

In a next step 32, the controller 6 calculates again a fuel injection timing based on the fuel flow rate QPB3 calculated in the step 31 and the detected signal read in the step 2.

In a step 33, the controller 6 compares the fuel flow rates QPB3 calculated in the step 31 and QA calculated in the step 12. If QA is smaller than QPB3, then control returns to the step 25, and if QA is larger than QPB3, then control proceeds to a step 34.

In the step 34, the controller 6 applies a signal to the dual electric power converter device 71 to increase the electric power therefrom.

The rotational speed NT2 of the second turbocharger 4 is detected by the rotational speed sensor 51 in a step 35.

In a step 36, the controller 6 applies a signal to the dual converter unit 75 to convert the output electric power from the dual electric power converter device 71 to three-phase electric power having such a frequency as to rotate the rotary electric machine 5 at a speed higher than the rotational speed NT2 detected in the step 35. The converted electric power is supplied from the dual converter unit 75 to the rotary electric machine 5 to drive the latter as a motor.

The rotational speed N'T2 of the second turbocharger 4 is detected again by the rotational speed sensor 51, and is compared with the rotational speed NT2 detected in the step 35 to determine whether the rotational speed of the second turbocharger 4 has increased or not in a step 37. If not increased, control goes back to the step 34, and if increased, control proceeds to a step 38.

In the step 38, the controller 6 reads the detected signal PCB4 from the boost pressure sensor 13.

Then, the controller 6 calculates in a step 39 a fuel flow rate QPB4 corresponding to the detected signal PCB3 read in the step 38.

In a next step 40, the controller 6 calculates again a fuel injection timing based on the fuel flow rate QPB4 calculated in the step 39 and the detected signal read in the step 2.

In a step 41, the controller 6 compares the fuel flow rates QPB4 calculated in the step 39 and QA calculated in the step 12. If QA is smaller than QPB4, then control goes back to the step 34, and if QA is larger than QPB4, then the fuel flow rate QA is set as an actual fuel flow rate Q, and fuel is supplied to the engine 1 at the timing calculated in the step 40. Thereafter, control returns to the step 1 to repeat the above sequence.

According to the present invention, the turbochargers 2, 4 are in a two-stage configuration to reduce their respective moments of inertia for thereby improving their response to the supply of electric power from the dual converter units 73, 75. When the turbochargers 2, 4 are started, they can be supplied with large instantaneous electric power so that their initial rotational speeds can be increased rapidly.

Figure 3:
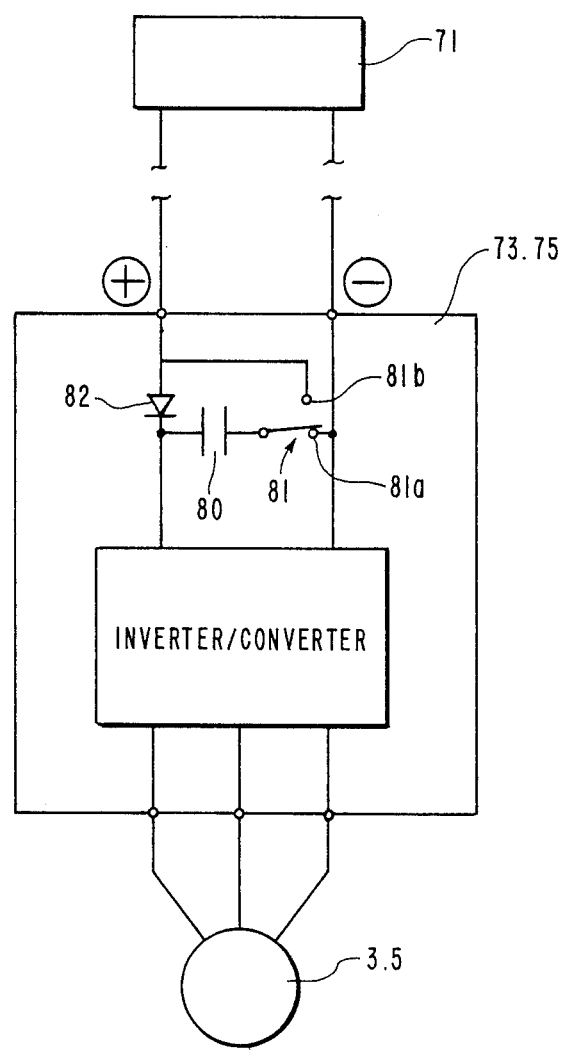
FIG. 3 is a block diagram of a high-electric-power generator circuit in each of dual converter units in the drive system.

FIG. 3 shows a high-electric-power generator circuit in each of the dual converter units 73, 75. The high-electric-power generator circuit includes a capacitor 80 connected through a two-contact switch 81 between DC terminals. The two-contact switch 81 has a terminal 81a connected to the negative DC terminal and a terminal 81b connected to the positive DC terminal. One terminal of the capacitor 80 is selectively connected to one of the terminals 81a, 81b. A diode 82 is coupled between the other terminal of the capacitor 80 and the terminal 81b.

Normally, the two-contact switch 81 is shifted to the terminal 81a and the capacitor 80 is charged. When a control signal for starting the rotary electric machine 73 or 75 is applied from the controller 6, the two-contact switch 81 is shifted to the terminal 81b. The voltage between the DC terminals is increased by the voltage across the capacitor 80. Thus, a voltage which is about twice the normal voltage is instantaneously applied to the inverter to increase the output from the inverter. Therefore, the rotational speed of the rotary electric machine 3 or 5 connected to the inverter is rapidly increased. Where the internal resistance of the dual electric power converter device 71 which supplies electric power is large, the internal resistance at the time of starting the rotary electric machine can be reduced by adding a capacitor between the output terminals of the dual electric power converter device 71.

With the present invention, when the two turbochargers with motor-generators mounted respectively on the rotatable shafts of their exhaust turbines connected in series with the exhaust passage from the engine are controlled, the motor-generators are operated as motors to increase the boost pressure when the engine rotates at a low speed and undergoes a high load. The engine combined with the turbocharger drive system of the invention can produce an increased torque due to the two-stage turbochargers driven by the motor-generators while the engine is rotating at a low speed. Consequently, the number of gear positions provided by a transmission can be reduced, a condition which has not been possible with a conventional single-stage turbocharger which is driven by only an exhaust turbine, so that the weight and cost of the motor vehicle can be lowered.

When the supplied amount of fuel is increased and the temperature in the cylinders is increased, the timing to start burning the supplied fuel is advanced. At this time, the timing for supplying fuel is delayed to normalize the timing to start burning the fuel. Therefore, pollutants contained in the exhaust gases are prevented from increasing, and the output power produced by the engine is prevented from being lowered.

Although a certain preferred embodiment has been shown and described, it should be understood that many changes and modifications may be made therein without departing from the scope of the appended claims.

What is claimed is:

1. A turbocharger drive system combined with an internal combustion engine, comprising:
a turbocharger assembly having a rotatable shaft;
a first rotary electric machine mounted on said rotatable shaft;
means for detecting a load on the internal combustion engine;
means for detecting a rotational speed of the internal combustion engine;
means for supplying fuel to the internal combustion engine;
a second rotary electric machine operatively coupled to an output shaft of the internal combustion engine;
means for driving said first rotary electric machine as an electric motor when it is determined from signals from said means for detecting the load and said means for detecting the rotational speed that the internal combustion engine rotates at a low speed and under a high load;
means for operating said second rotary electric machine as an electric generator;
means for supplying electric power generated by said electric generator to said electric motor; and
means for delaying a timing to supply fuel from said fuel supplying means to the internal combustion engine when at least one of an increase in the load and a reduction in the rotational speed is detected by said means for detecting the load and said means for detecting the rotational speed.

2. A turbocharger drive system according to claim 1, wherein said turbocharger assembly comprises a plurality of turbochargers each having a first rotary electric machine and having series-connected exhaust turbines, respectively, and series-connected compressors, respectively, further comprising means for detecting a boost pressure of the internal combustion engine, means for calculating the difference between a boost pressure corresponding to the detected load and the detected boost pressure when it is determined that the internal combustion engine rotates at a low speed and under a high load, and means for successively driving the first rotary electric machines mounted on the rotatable shafts of the turbochargers as said difference increases.

3. A turbocharger drive system according to claim 2, further including air intake passages coupled respectively to the compressors of said plurality of turbochargers, and means for successively opening said air intake passages.

4. A turbocharger drive system according to claim 1 wherein said electric generator comprises an AC electric generator, said means for supplying electric power comprising a converter for rectifying AC electric power generated by said AC electric generator into DC electric power, and an inverter for converting the DC electric power to AC electric power having a predetermined frequency and supplying the AC electric power to said motors.

5. A turbocharger drive system according to claim 4, wherein said means for supplying electric power has means for increasing the electric power supplied to the electric motor when the electric motor starts being driven.

6. A turbocharger drive system according to claim 1 wherein said internal combustion engine comprises a thermally insulated engine having at least inner walls of combustion chambers made of thermally insulating ceramic.

7. A turbocharger drive system according to claim 2, wherein said electric generator comprises an AC electric generator, said means for supplying electric power comprising a converter for rectifying AC electric power generated by said AC electric generator into DC electric power, and an inverter for converting the DC electric power to AC electric power having a predetermined frequency and supplying the AC electric power to said motors.

8. A turbocharger drive system according to claim 2, wherein said internal combustion engine comprises a thermally insulated engine having at least inner walls of combustion chambers made of thermally insulating ceramic.

9. A turbocharger drive system according to claim 3, wherein said internal combustion engine comprises a thermally insulated engine having at least inner walls of combustion chambers made of thermally insulating ceramic.

10. A turbocharger drive system according to claim 4, wherein said internal combustion engine comprises a thermally insulated engine having at least inner walls of combustion chambers made of thermally insulating ceramic.

11. A turbocharger drive system according to claim 5, wherein said internal combustion engine comprises a thermally insulated engine having at least inner walls of combustion chambers made of thermally insulating ceramic.

* * * * *